United States Patent
Lin

(10) Patent No.: US 10,630,404 B2
(45) Date of Patent: Apr. 21, 2020

(54) RECEIVED SIGNAL STRENGTH INDICATION MEASUREMENT WITH UPLINK INTERFERENCE HANDLING

(71) Applicant: MEDIATEK INC., Hsinchu (TW)

(72) Inventor: Hsuan-Li Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/243,330

(22) Filed: Jan. 9, 2019

(65) Prior Publication Data

US 2019/0222327 A1 Jul. 18, 2019

Related U.S. Application Data

(60) Provisional application No. 62/616,622, filed on Jan. 12, 2018.

(51) Int. Cl.
| | |
|---|---|
| *H04B 17/318* | (2015.01) |
| *H04W 24/10* | (2009.01) |
| *H04W 72/04* | (2009.01) |
| *H04W 72/12* | (2009.01) |

(52) U.S. Cl.
CPC .......... *H04B 17/318* (2015.01); *H04W 24/10* (2013.01); *H04W 72/0446* (2013.01); *H04W 72/1231* (2013.01); *H04W 72/1268* (2013.01)

(58) Field of Classification Search
CPC ................ H04B 17/318; H04W 24/10; H04W 72/0446; H04W 72/1231; H04W 72/1268
See application file for complete search history.

(56) References Cited

U.S. PATENT DOCUMENTS

| | | | |
|---|---|---|---|
| 10,390,251 B2 * | 8/2019 | Uemura ............... | H04B 17/318 |
| 2012/0087264 A1 | 4/2012 | Lindoff et al. ............... | 370/252 |
| 2012/0263054 A1 | 10/2012 | Kazmi et al. ............... | 370/252 |
| 2012/0320845 A1 * | 12/2012 | Choi ...................... | H04W 64/00 370/329 |
| 2016/0192339 A1 | 6/2016 | Axmon et al. ............... | 370/329 |

FOREIGN PATENT DOCUMENTS

| | | |
|---|---|---|
| CN | 103181215 A | 11/2010 |
| CN | 105474682 A | 8/2013 |

OTHER PUBLICATIONS

International Search Report and Written Opinion of International Search Authority for PCT/CN2019/071168 dated Mar. 26, 2019 (9 pages).

* cited by examiner

*Primary Examiner* — Brenda H Pham
(74) *Attorney, Agent, or Firm* — Imperium Patent Works; zheng jin

(57) ABSTRACT

A method of performing received signal strength indication (RSSI) measurements in new radio (NR) networks is proposed. When RSSI-Measurement time slots and OFDM symbols are configured by high-layer signaling, UE can assume the timing reference of a target carrier is the frame boundary of the serving cell or any detected cells on that carrier. UE then performs RSSI measurements according to the timing reference and the configured RSSI-Measurement slot/symbol. UE derives the timing location of the configured slot/symbol according to the timing reference and the subcarrier spacing (SCS) of the synchronization signal block (SSB) in the target carrier.

20 Claims, 4 Drawing Sheets

RSSI measurement configuration including slots and symbols

RECEIVED SIGNAL STRENGTH INDICATION MEASUREMENT WITH UPLINK INTERFERENCE HANDLING

CROSS REFERENCE TO RELATED APPLICATIONS

This application claims priority under 35 U.S.C. § 119 U.S. provisional application 62/616,622 entitled "SS-RSSP with UL Interference handling" filed on Jan. 12, 2018, the subject matter of which is incorporated herein by reference.

TECHNICAL FIELD

The disclosed embodiments relate generally to wireless communication, and, more particularly, to method and apparatus for received signal strength indication (RSSI) measurement with uplink (UL) interference handling.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

Reference Signal Received Power (RSRP) and Reference Signal Received Quality (RSRQ) are key measurements of signal level and quality for LTE and NR networks. In cellular networks, when UE moves from cell to cell and performs cell selection, reselection and handover, UE needs to measure the signal strength and quality of the neighbor cells. Received Strength Signal Indicator (RSSI) measurements can be used to determine RSRP and RSRQ. RSSI measures the average total received power observed in OFDM symbols containing reference symbols in the measurement bandwidth over certain resource blocks. RSSI is measured over the entire bandwidth including noise, serving cell power and interference power.

In NR systems, UE can be configured to measure synchronization signal (SS) blocks (SSB) and/or channel state information (CSI) reference signal (CSI-RS). Since RSSI measurement can be used to derive SS-RSRP and SS-RSRQ, sometimes RSSI is referred to as NR carrier RSSI or SS-RSSI. For SS-RSSI measurement, a set of time slots and OFDM symbols for SS-RSSI time-domain measurement resource can be explicitly configured per frequency carrier for a UE in RRC_CONNECTED mode and in RRC_IDLE mode. The time slots for RSSI measurement resource are configured by a bitmap with each bit corresponding to each slot of the slots within the SSB measurement time configuration (SMTC) window duration. OFDM symbols level configuration for the configured slots is achieved via configuring a limited set of ending symbols, and the set of symbols in a slot for RSSI measurement resource is from symbol 0 to the ending symbol. The time duration $T_{RSSI}$ for the by-default RSSI measurements is defined as follows: $T_{RSSI}$=configured SMTC measurement window if measurement gap is not used; or $T_{RSSI}$=overlapped time span between configured SMTC measurement window and minimum measurement time within measurement gap if measurement gap is used.

The cell-specific timing for RSSI measurement will involve frame boundary and slot boundary detection, and it will introduce more UE complexity due to reading the physical broadcast channel (PBCH). For carrier-specific RSSI measurement, the configured slots and symbols are aimed to avoid uplink symbols for time division duplex (TDD) case. It is reasonable to assume certain level of synchronization between cells with the configured slots and symbols for RSSI measurement.

SUMMARY

A method of performing received signal strength indication (RSSI) measurements in new radio (NR) networks is proposed. When RSSI-Measurement time slots and OFDM symbols are configured by high-layer signaling, UE can assume the timing reference of a target carrier is the frame boundary of the serving cell or any detected cells on that carrier. For intra-frequency measurement, UE assumes the timing reference of a target carrier is the frame boundary of the serving cell. For inter-frequency measurement, UE assumes the timing reference of a target carrier is the frame boundary of any detected cells on that carrier. UE then performs RSSI measurement according to the timing reference and the configured RSSI-Measurement slot/symbol. UE derives the timing location of the configured slot/symbol according to the timing reference and the subcarrier spacing (SCS) of the synchronization signal block (SSB) in the target carrier.

In one embodiment, a UE receives a received signal strength indication (RSSI) measurement configuration from a new radio (NR) network. The RSSI measurement configuration comprises a target carrier and a slot and symbol configuration for RSSI measurements. The UE determines a timing reference of the target carrier for RSSI measurements. The UE derives timing location of a plurality of configured slots and symbols based on the slot and symbol configuration. The UE performs RSSI measurements using the derived timing location.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
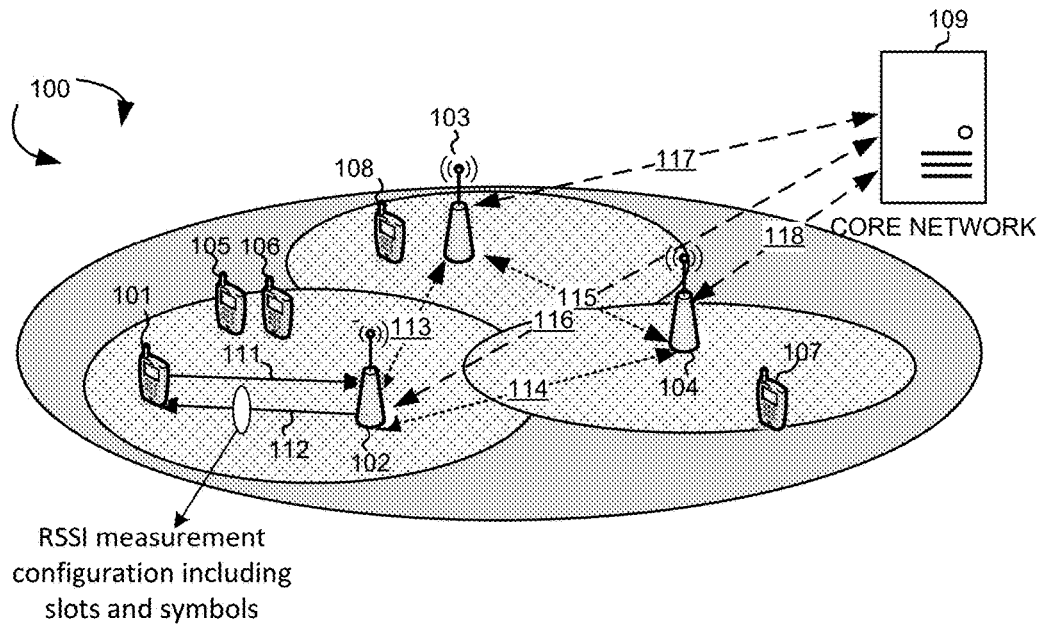
FIG. 1 illustrates a system diagram of a new radio (NR) wireless system with configured slots and symbols for RSSI measurement in accordance with embodiments of the current invention.

FIG. 1 illustrates a system diagram of a new radio (NR) wireless system 100 with slots and symbols configured for Received Strength Signal Indicator (RSSI) measurement in accordance with embodiments of the current invention. Wireless communication system 100 comprises one or more wireless networks having fixed base infrastructure units, such as receiving wireless communications devices or base units 102 103, and 104, forming wireless radio access networks (RANs) distributed over a geographical region. The base units may also be referred to as an access point (AP), an access terminal, a base station (BS), a Node-B, an eNodeB, an eNB, a gNodeB, a gNB, or by other terminology used in the art. Each of the base unit 102, 103, and 104 serves a geographic area and connects to a core network 109 e.g., via links 116, 117, and 118 respectively. The base unit performs beamforming in the NR system, e.g., utilizing Millimeter Wave frequency spectrum. Backhaul connections 113, 114 and 115 connect the non-co-located receiving base units, such as 102, 103, and 104. The backhaul connections can be ideal or non-ideal.

A wireless communications device UE 101 in wireless system 100 is served by base station 102 via uplink 111 and downlink 112. Other UEs 105, 106, 107, and 108 are served by different base stations. UEs 105 and 106 are served by base station 102. UE 107 is served by base station 104. UE 108 is served by base station 103. Each UE may be a smart phone, a wearable device, an Internet of Things (IoT) device, a tablet, etc. In OFDMA systems, the radio resource is partitioned into radio frames and subframes, each of which is comprised of time slots and OFDMA symbols along time domain. Each OFDMA symbol further consists of a number of OFDMA subcarriers along frequency domain depending on the system bandwidth. The basic unit of the resource grid is called Resource Element (RE), which spans a subcarrier over one OFDMA symbol. A resource block occupies one slot and twelve subcarriers.

The Received Strength Signal Indicator (RSSI) measures the average total received power observed in OFDM symbols containing reference symbols in the measurement bandwidth over certain resource blocks. RSSI measurement can be used for Synchronization Signal-Reference Signal Received Power (SS-RSRP) and Reference Signal Received Quality (SS-RSRQ) determination to facilitate cell selection, reselection and handover. In NR systems, SSB measurement time configuration (SMTC) measurement window is a time period to inform UE the possible timing location of SSB. UE would search SSB within SMTC. At the same time, UE would measure RSSI within SMTC. Specifically, a set of time slots for SS-RSSI time-domain measurement resource can be explicitly configured per frequency carrier for a UE in RRC_CONNECTED mode and in RRC_IDLE mode. The slots for RSSI measurement resource are configured by a bitmap with each bit corresponding to each slot of the slots within the SMTC window duration. OFDM symbols level configuration for the configured slots is achieved via configuring a limited set of ending symbols, and the set of symbols in a slot for RSSI measurement resource is from OFDM symbol 0 to the ending OFDM symbol. The cell-specific timing for SS-RSSI measurement involves frame boundary and slot boundary detection because different cells would have different slot timings. As a result, it introduces more UE complexity due to the need of reading the physical broadcast channel (PBCH). For carrier-specific SS-RSSI measurement, it is thus reasonable to assume certain level of synchronization between cells when the time slots and OFDM symbols are configured by the network.

In accordance with one novel aspect, UE 101 receives radio resource control (RRC) signaling for SS-RSSI Measurement configuration from BS 102. The SS-RSSI-Measurement configuration comprises carrier frequency and slot/symbol configuration. When SS-RSSI-Measurement slot/symbol is configured by the RRC signaling, UE 101 can assume the timing reference of a target carrier is the frame boundary of the serving cell or any detected cells on that carrier. For intra-frequency measurement, UE 101 assumes the timing reference of a target carrier is the frame boundary of the serving cell. For inter-frequency measurement, UE 101 assumes the timing reference of a target carrier is the frame boundary of any detected cells on that carrier. UE 101 then performs RSSI measurement according to the timing reference and the configured SS-RSSI-Measurement slot/symbol. UE 101 derives the timing location of the configured slot/symbol according to the timing reference and the subcarrier spacing (SCS) of the SSB in the target carrier. In one embodiment, while performing RSSI measurement, UE 101 skips at least one of the following symbols: 1) its own uplink symbols; and 2) symbols potentially used for uplink, e.g., when time division duplex (TDD) configuration is unknown to UE 101 in LTE systems.

Figure 2:
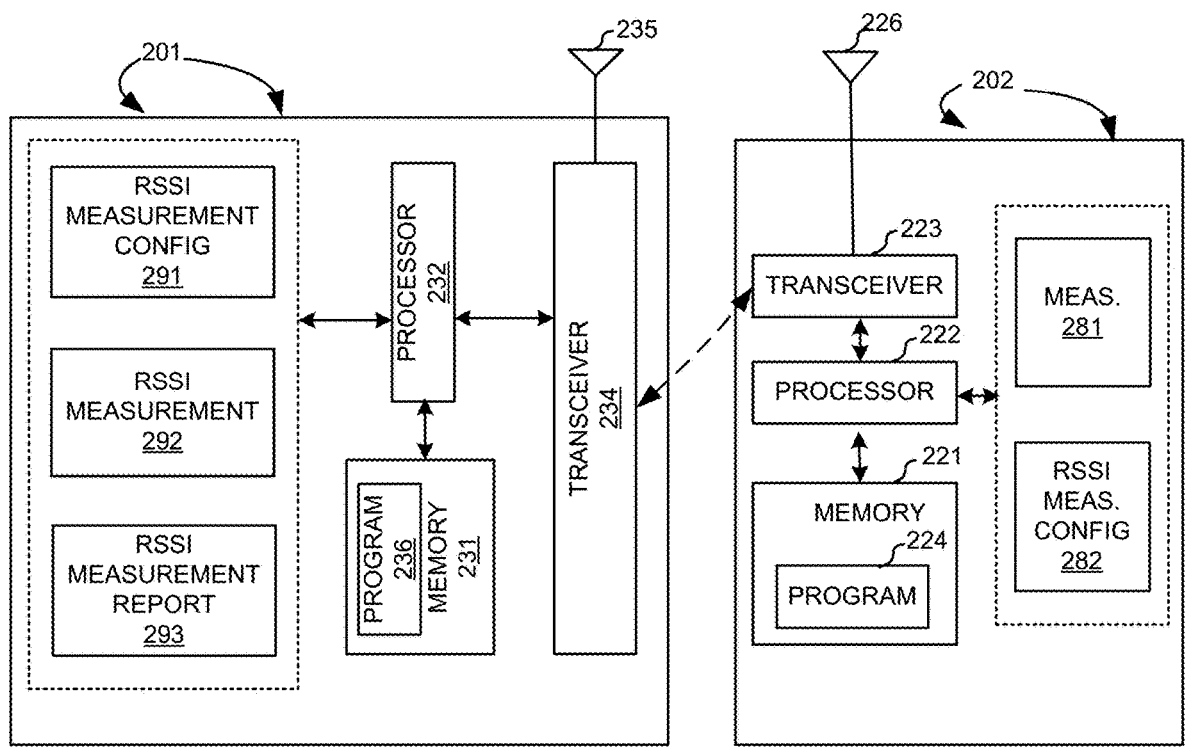
FIG. 2 shows simplified block diagrams of a UE and a BS in accordance with embodiments of the current invention.

FIG. 2 shows simplified block diagrams of a wireless devices, e.g., UE 201 and base station 202 in accordance with the current invention. Base station 202 has an antenna 226, which transmits and receives radio signals. A RF transceiver module 223, coupled with the antenna, receives RF signals from antenna 226, converts them to baseband signals and sends them to processor 222. RF transceiver 223 also converts received baseband signals from processor 222, converts them to RF signals, and sends out to antenna 226. Processor 222 processes the received baseband signals and invokes different functional modules to perform features in base station 202. Memory 221 stores program instructions and data 224 to control the operations of base station 202. Base station 202 also includes a set of control modules and circuits, such as a measurement circuit 281 that performs measurements and an RSSI measurement configuration circuit 282 that configures RSSI measurements for UEs.

Similarly, UE 201 has an antenna 235, which transmits and receives radio signals. A RF transceiver module 234, coupled with the antenna, receives RF signals from antenna 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in mobile station 201. Memory 231 stores program instructions and data 236 to control the operations of mobile station 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines.

UE 201 also includes a set of control modules and circuits that carry out functional tasks. These functions can be implemented in software, firmware and hardware. A processor in associated with software may be used to implement and configure the functional features of UE 201. For example, an RSSI measurement configuration circuit 291 configures an RSSI measurement configuration. The RSSI measurement configuration includes target frequency carrier and slot/symbol configuration. An RSSI measurement circuit 292 performs an RSSI/RSRP/RSRQ measurement based on the RSSI measurement configuration. An RSSI measurement report circuit 293 transmits RSSI/RSRP/RSRQ measurement report to the NR network for RRM.

Figure 3:
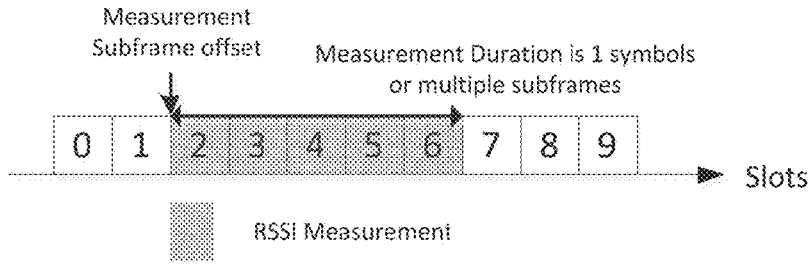
FIG. 3 illustrates RRC configuration for RSSI and channel occupancy measurement on the indicated carrier frequency in LTE networks.

FIG. 3 illustrates RRC configuration for RSSI and channel occupancy measurement on the indicated carrier frequency in LTE networks. In LTE networks, the RSSI measurement time configuration (RMTC) measurement object rmtc-Config configures parameters applicable to RSSI and channel occupancy measurement on the carrier frequency indicated by carrierFreq. The rmtc-Config comprises rmtc-Period, rmtc-SubframeOffset, measDuration. The rmtc-Period indicates the RMTC periodicity for this carrier frequency, Value ms40 corresponds to 40 ms periodicity, ms80 corresponds to 80 ms periodicity, and so on. The rmtc-SubframeOffset indicates the RMTC subframe offset for this carrier frequency. The value of rmtc-SubframeOffset should be smaller than the value of rmtc-Period. For inter-frequency measurements, this field is optional. If this field is not configured, then UE chooses a random value as rmtc-SubframeOffset for measDuration which shall be selected to be between 0 and the configured rmtc-Period with equal probability. The measDuration indicates the number of consecutive symbols for which the physical layer reports samples of RSSI. Value sym1 corresponds to one symbol, sym14 corresponds to 14 symbols, and so on. Note that such time configuration is less sensitive to timing difference since it is based on consecutive symbols and/or consecutive subframes.

For next generation new radio (NR), the design considerations for RSSI measurements are 1) uplink (UL) interference avoidance; 2) measurement bandwidth; and 3) UE complexity. For both RRC Connected mode and RRC Idle mode, the network indicates the slots and the ending symbols for RSSI measurements. While timing reference for RSSI is not specified in LTE, timing reference for RSSI is specified in NR. In LTE, if higher-layer indicates certain subframes for performing RSRQ measurements, then RSSI is measured from all OFDM symbols of the DL part of the indicated subframes. In NR, for intra-frequency measurements, NR carrier RSSI is measured with timing reference corresponding to the serving cell in the frequency layer; for inter-frequency measurements, NR carrier RSSI is measured with timing reference corresponding to any cell in the target frequency layer.

Figure 4:
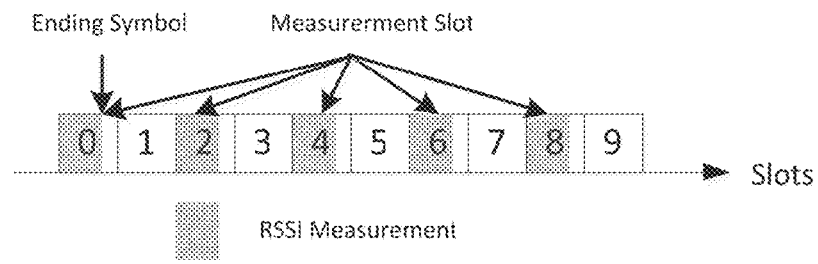
FIG. 4 illustrates a measurement object for RSSI measurement comprising measurement time slots and measurement OFDM symbols in NR networks in accordance with one novel aspect.

FIG. 4 illustrates a measurement object for RSSI measurement comprising measurement time slots and measurement OFDM symbols in NR networks in accordance with one novel aspect. In NR, the SS-RSSI-Measurement object comprises per frequency/carrier configuration and SS-RSSI can be configured as "slot basis". The SS-RSSI-Measurement comprises measurementSlots and endSymbol. The measurementSlots parameter is a BIT STRING that indicates the slots in which the UE can perform RSSI measurements. The length of the BIT STRING is equal to the number of slots in the configured SMTC window (determined by the duration and by the subcarrierSpacing). The first (left-most/most significant) bit in the bitmap corresponds to the first slot in the SMTC window, the second bit in the bitmap corresponds to the second slot in the SMTC window, and so on. The UE measures in slots for which the corresponding bit in the bitmap is set to 1. The endSymbol parameter indicates the OFDM symbols in which the UE can perform RSSI measurement. Within a slot that is configured for RSSI measurements (see measurementSlots), the UE measures the RSSI from symbol 0 to symbol endSymbol. This field identifies the entry depicted in Table 410 which determines the actual end symbol. For example, if endSymbol=2, then the UE measures the RSSI for symbols 0, 1, 2, 3, 4, and 5.

Figure 5:
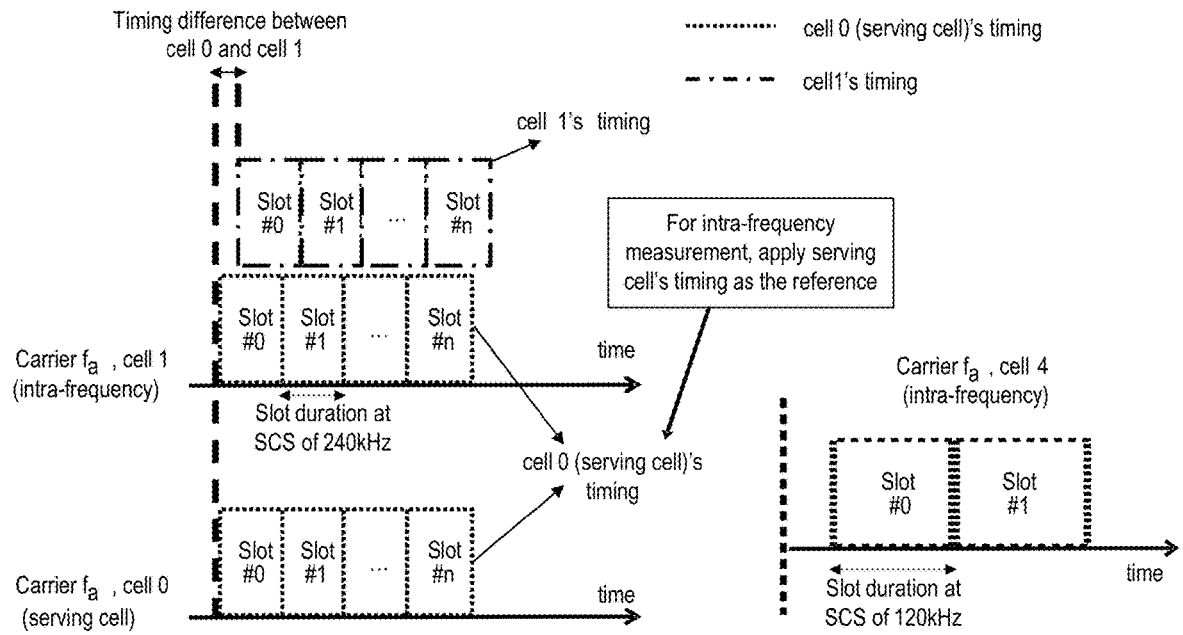
FIG. 5 illustrates one embodiment of intra-frequency RSSI measurement in accordance with one novel aspect of the present invention.

FIG. 5 illustrates one embodiment of intra-frequency RSSI measurement in accordance with one novel aspect of the present invention. Typically, UE detects the SSB to acquire timing synchronization of a cell, then applies the acquired timing to measure the RSSI associated to the cell. For RSSI measurement, the network configures not only the carrier frequency resource, but also the time resource of slots and symbols. Note different cells would have different slot timing. Therefore, the slot timing impacts the measurement accuracy for discontinuous or fractional slot measurements. In the example of FIG. 5, UE is served on carrier frequency fa and is configured to perform intra-frequency measurements for the same carrier frequency fa, cell0 is the serving cell, and cell1 is the non-serving cell. There is timing difference between cell0 and cell1. The slot offset for a frequency carrier is typically referenced to the frame boundary of system frame number SFN*0. If the associated SSB is NOT configured, UE can assume that cells on that frequency carrier are synchronized. Therefore, for intra-frequency measurement on carrier fa, UE acquires cell0 (serving cell)'s timing (frame, slot, symbol boundary), and UE then applies cell0's timing as the reference to determine the timing location of the configured time slots and OFDM symbols for RSSI measurements—according to the timing reference and the subcarrier spacing (SCS) of the synchronization signal block (SSB) in carrier fa. Note that SCS will impact on the timing position of slots, e.g., slot*1. Typically, same SCS will be applied to all cells on the same carrier frequency. However, different SCS could be applied to different cells on the same carrier frequency. For example, cells 0 and 1 applies SCS of 240 kHz, while cell 4 applies SCS of 120 kHz. As depicted in FIG. 5, the slot duration at SCS of 240 kHz is half of the slot duration at SCS of 120 kHz. As a result, the relative timing position of slots in cell 4 is different from the relative timing position of slots in cell 0 and cell 1 applied with different SCS.

Figure 6:
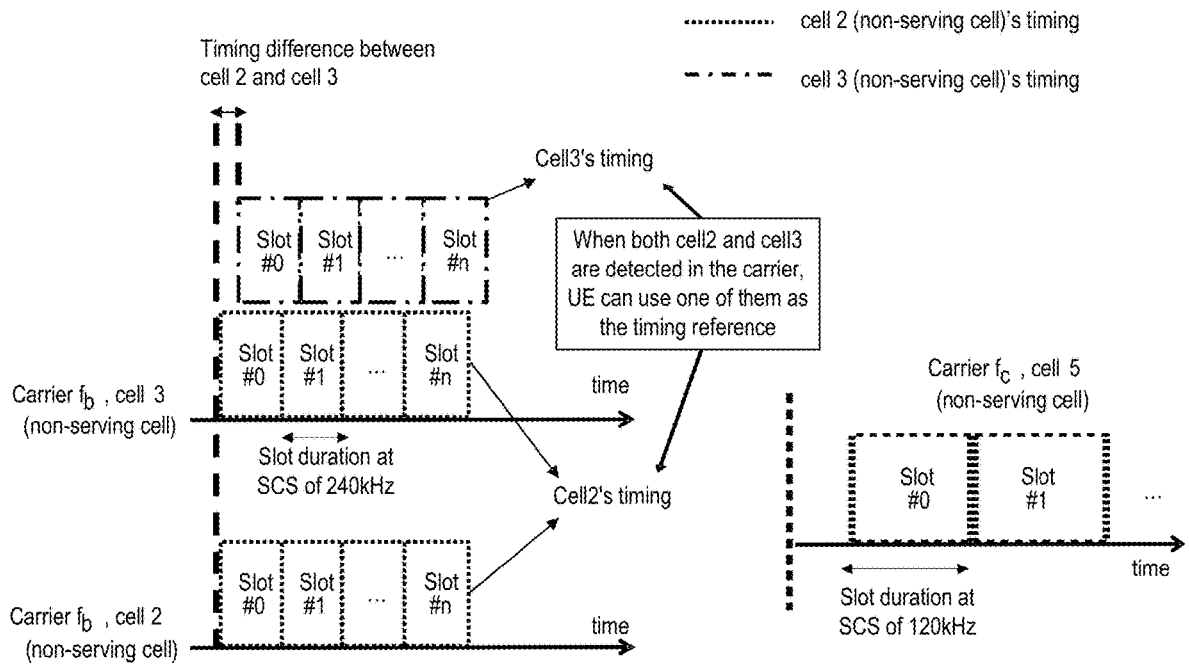
FIG. 6 illustrates one embodiment of inter-frequency RSSI measurement in accordance with one novel aspect of the present invention.

FIG. 6 illustrates one embodiment of inter-frequency RSSI measurement in accordance with one novel aspect of the present invention. Typically, UE detects the SSB to acquire timing synchronization of a cell, then applies the acquired timing to measure the RSSI associated to the cell. For RSSI measurement, the network configures not only the carrier frequency resource, but also the time resource of slots and symbols. Note different cells would have different slot timing. Therefore, the slot timing impacts the measurement accuracy for discontinuous or fractional slot measurements. In the example of FIG. 6, UE is served on carrier frequency fa but is configured to perform inter-frequency measurements for a different carrier frequency fb, both cell2 and cell3 are the non-serving cells. There is timing difference between cell2 and cell3. For inter-frequency measurement, the timing reference is the frame boundary of any detected cells in the target carrier. Therefore, to perform inter-frequency RSSI measurements on carrier fb, UE acquires one of the detected cell's (either cell2's or cell3's) timing (frame, slot, symbol boundary), and UE then applies that cell's timing as the reference to determine the timing location of the configured time slots and OFDM symbols for RSSI measurements—according to the timing reference and the subcarrier spacing (SCS) of the synchronization signal block (SSB) in carrier fb. Note that SCS will impact on the timing position of slots, e.g., slot*1. Different SCS can be applied on different frequency carrier. For example, frequency carrier fb applies SCS of 240 kHz, while frequency carrier fc applies SCS of 120 kHz. As depicted in FIG. 6, the slot duration at SCS of 240 kHz is half of the slot duration at SCS of 120 kHz. As a result, the slot timing position is different for cells 2 and 3 in frequency carrier fb as compared to cell 5 in frequency carrier fc applied with different SCS.

Figure 7:
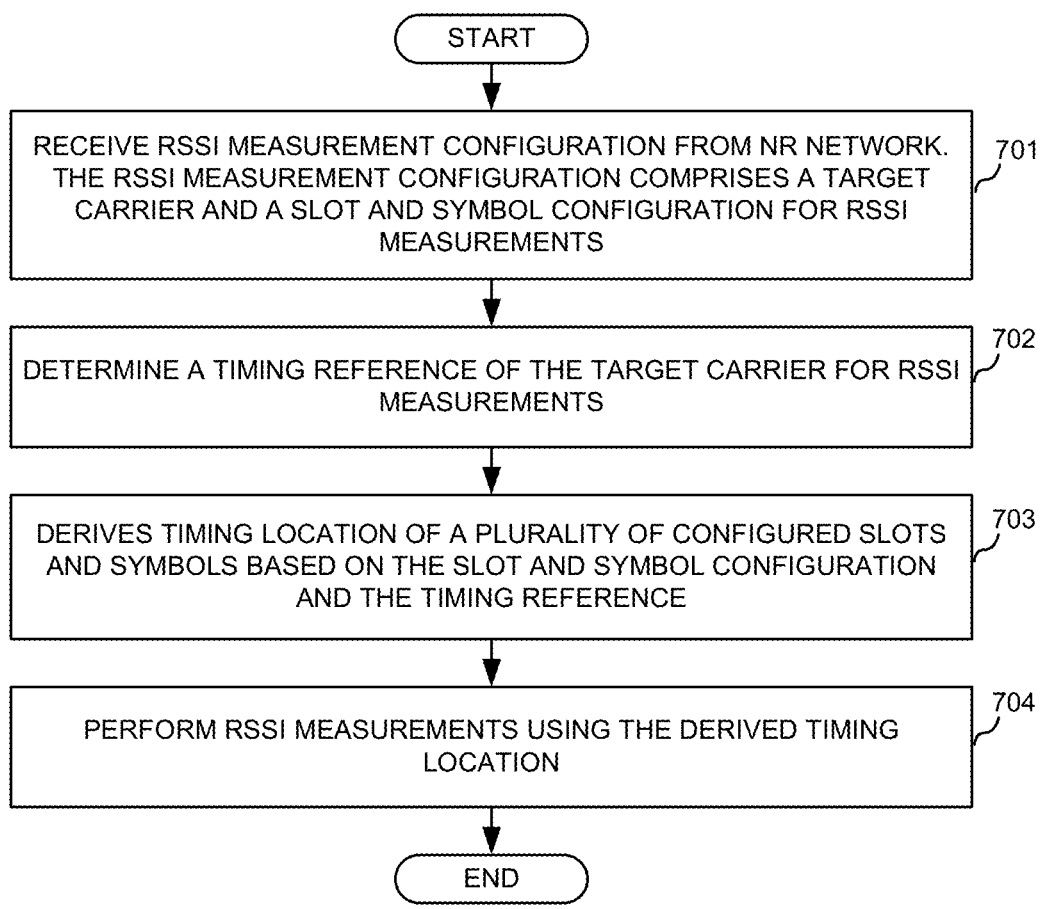
FIG. 7 is a flow chart of a method for RSSI measurement in accordance with embodiments of the current invention.

FIG. 7 is a flow chart of a method for RSSI measurement in accordance with embodiments of the current invention. In step 701, a UE receives a received signal strength indication (RSSI) measurement configuration from a new radio (NR) network. The RSSI measurement configuration comprises a target carrier and a slot and symbol configuration for RSSI measurements. In step 702, the UE determines a timing reference of the target carrier for RSSI measurements. In step 703, the UE derives timing location of a plurality of configured slots and symbols based on the slot and symbol configuration and the timing reference. In step 704, the UE performs RSSI measurements using the derived timing location. For intra-frequency measurements, the timing reference of the target carrier is a frame boundary of a serving cell of the UE. For inter-frequency measurements, the timing reference of the target carrier is a frame boundary of a detected cell on the target carrier.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a received signal strength indication (RSSI) measurement configuration by a user equipment (UE) from a new radio (NR) network, wherein the RSSI measurement configuration comprises a target carrier and a slot and symbol configuration for RSSI measurements;
determining a timing reference of the target carrier for RSSI measurements;
deriving timing location of a plurality of configured slots and symbols based on the slot and symbol configuration and the timing reference; and
performing RSSI measurements by the UE using the derived timing location.

2. The method of claim 1, wherein the slot and symbol configuration indicate the plurality of configured slots for RSSI measurements.

3. The method of claim 1, wherein the slot and symbol configuration indicate a number of OFDM symbols within each configured slot for RSSI measurements.

4. The method of claim 1, wherein the UE performs intra-frequency RSSI measurements.

5. The method of claim 4, wherein the timing reference of the target carrier is a frame boundary of a serving cell of the UE.

6. The method of claim 1, wherein the UE performs inter-frequency RSSI measurement.

7. The method of claim 6, wherein the timing reference of the target carrier is a frame boundary of a detected cell on the target carrier.

8. The method of claim 1, wherein the UE performs RSSI measurements and skips a scheduled uplink symbol among the plurality of configured symbols.

9. The method of claim 1, wherein the UE performs RSSI measurements and skips a potential uplink symbol based on a predefined uplink-downlink format.

10. The method of claim 1, wherein the UE derives the timing location according to the determined timing reference and a subcarrier spacing of a synchronization signal block in the target carrier.

11. A User Equipment (UE) comprising:
a receiver that receives a received signal strength indication (RSSI) measurement configuration from a new radio (NR) network, wherein the RSSI measurement configuration comprises a target carrier and a slot and symbol configuration for RSSI measurements;
an RSSI measurement configuration circuit that determines a timing reference of the target carrier for RSSI measurements, wherein the UE derives timing location of a plurality of configured slots and symbols based on the slot and symbol configuration and the timing reference; and
a measurement circuit that performs RSSI measurements by the UE using the derived timing location.

12. The UE of claim 11, wherein the slot and symbol configuration indicate the plurality of configured slots for RSSI measurements.

13. The UE of claim 11, wherein the slot and symbol configuration indicate a number of OFDM symbols within each configured slot for RSSI measurements.

14. The UE of claim 11, wherein the UE performs intra-frequency RSSI measurements.

15. The UE of claim 14, wherein the timing reference of the target carrier is a frame boundary of a serving cell of the UE.

16. The UE of claim 11, wherein the UE performs inter-frequency RSSI measurement.

17. The UE of claim 16, wherein the timing reference of the target carrier is a frame boundary of a detected cell on the target carrier.

18. The UE of claim 11, wherein the UE performs RSSI measurements and skips a scheduled uplink symbol among the plurality of configured symbols.

19. The UE of claim 11, wherein the UE performs RSSI measurements and skips a potential uplink symbol based on a predefined uplink-downlink format.

20. The UE of claim 11, wherein the UE derives the timing location according to the determined timing reference and a subcarrier spacing of a synchronization signal block in the target carrier.

* * * * *